UNITED STATES PATENT OFFICE.

EMIL VON PORTHEIM, OF PRAGUE-SMICHOW, AUSTRIA-HUNGARY.

PROCESS FOR PRODUCING OXALIC ACID.

1,157,348.  Specification of Letters Patent.  Patented Oct. 19, 1915.

No Drawing.  Application filed October 3, 1914. Serial No. 864,882.

*To all whom it may concern:*

Be it known that I, EMIL VON PORTHEIM, manufacturer, being a subject of the Emperor of Austria-Hungary, residing at Prague-Smichow, in Bohemia, Austria-Hungary, have invented certain new and useful Improvements in Processes for Producing Oxalic Acid; and I do hereby declare the following to be a full, clear, and exact description of the invention, such as will enable others skilled in the art to which it appertains to make and use the same.

The process for producing oxalic acid from carbohydrates by means of nitric acid (with or without the presence of a catalyzer) hitherto in use, brings the reaction down to a state in which the nitric acid is rarefied to such an extent by giving off oxygen and nitrous gases, as to render it unable to oxidize the carbohydrates. When the reaction has thus become stationary, the solution subjected to reaction still contains nitric acid of about 20–30%, the remaining carbohydrates, the intermediary products of oxidation of these latter, and the catalyzer employed, and it will be found to be saturated with oxalic acid after the crystallized oxalic acid has been filtered out. The said solution is so valuable as to render its utilization of the greatest possible importance for the commercial significance of the process.

To this end various means have been tried to compensate for the rarefaction of the reaction solution with the view to obtaining a continuation of the reaction process. Thus it has been suggested to concentrate the solution *in vacuo*. This however cannot be done without oxidizing, to a large extent, the carbohydrate and the oxalic acid into carbonic acid. Further the attempt has been made to raise the concentration of the nitric acid in the reaction solution again to its original point by adding to the solution a highly concentrated nitric acid. But in consideration of the fact that the nitrous gases, arising from the reaction, were converted in towers in the known manner, into nitric acid of only about 52%, it was necessary to concentrate this said 52% nitric acid up to 94%, which as is well known, proves very expensive. Notwithstanding, even an acid concentrated to a maximum degree will add water to the reaction solution, for even a nitric acid concentrated to the technically highest degree possible will, on its decomposition, yield a quantity of water equal to 20% of its own weight as a result of the oxidizing action. The suggestion to work the reaction solution up by the aid of bases, proved still less practicable.

We have now found that a continuous working with one and the same solution is possible if nitrogen peroxid ($NO_2$ or $N_2O_4$) is added to the reaction solution in the place of nitric acid. This said nitrogen peroxid may suitably be obtained by oxidation with air or oxygen from the nitrous gases arising during the reaction, and may then be separated out, say by liquefaction, from the remaining portion of the air. The nitrogen peroxid may be introduced into the reaction either in a liquid or gaseous state. In the former case, it settles below the reaction solution and slowly dissolves within the same.

However, the nitrogen peroxid may likewise be introduced from an external source of supply, for example, from reaction vessels in which the same reaction process is being carried out by means of nitric acid (this of course after the admission of air), or from reactions of a wholly different description. In this case it is unnecessary to employ concentrated nitric acid, the reaction will prove successful, if the starting preparation be an aqueous solution of sugar or a solution of sugar contained in rarefied nitric acid.

By these means the possibility is given of proceeding with the reaction without altering the degree of concentration of the reaction solution. All that need be done is to add nitrogen peroxid and fresh quantities of carbohydrates, and to remove from time to time the oxalic acid which has formed. In the place of these said solutions it is also possible to work with an addition of glacial acetic acid or any other absorbents for the nitrogen peroxid or even without any solvent altogether.

The nitrous gases act as a carrier for the oxygen (say of the air) onto the carbohydrate; the oxygen derived from the nitric acid being in some cases employed at the initial stage of the process.

Example I: 100 parts by weight of sugar, 400 parts by weight of nitric acid of a density of 1.4 and 2 parts by weight of oxid of molybdenum are allowed to stand while cooling; the escaping gases are mixed with air, and the nitrogen peroxid thus formed is liquefied, the product of condensation being allowed to flow back constantly into the preparing vessel. As soon as the development of the lower nitric oxid ceases, the oxalic acid is filtered, sugar (to about the same quantity as has been used up) is added afresh to the solution, whereupon the reaction may begin again. The oxalic acid which has been filtered is purified by re-crystallization.

Example II: Into a solution of 100 parts by weight of sugar and 0.2 parts by weight of vanadic acid contained in 150 parts by weight of nitric acid of a density of 1.2 there are introduced the nitrous gases escaping from a second reaction vessel and which are oxidized by the admixture with air, after the oxidation has been carried through, the gases are freed from any excess of air in the known manner by introducing them into concentrated sulfuric acid and then re-expeling the nitrous gases. Within a short space of time the formation of oxalic acid commences and simultaneously with it the development of the lower nitric oxids, which latter are re-oxidized and passed on into a third preparing vessel.

As soon as the development of the nitric oxids obtained from one reaction (being the one first set out with) begins to slacken to any considerable degree, the vessel is removed from the cycle, the contents are filtered, and sugar is again added to the mother liquor, whereupon the vessel is re-introduced into the cycle as the last of the series.

Example III: A flow of nitrogen peroxid, in some cases mixed with air, is passed through a solution of 100 parts by weight of sugar, 2 parts by weight of oxid of molybdenum and 100 parts by weight of water. When the solution is replete with crystals it is filtered, sugar is again added to the filtrate (say about as much as has been used up) and nitrogen peroxid is introduced afresh.

Example IV: 100 parts by weight of sugar are mixed with 0.2 parts by weight of vanadic acid, spread in a thin coat on hurdles and subjected to the action of nitrogen peroxid. The sugar will then be gradually converted into oxalic acid.

I claim—

1. The process of producing oxalic acid from a solution of carbo-hydrates in the presence of nitric acid and a catalyzer, which comprises oxidizing the nitrogen oxid gas escaping during the reaction and introducing such oxidized gas into the solution.

2. The process of producing oxalic acid from a solution of carbohydrate in the presence of a catalyzer, which comprises introducing peroxid of nitrogen ($NO_2$) into the solution.

3. The process of producing oxalic acid from a solution containing carbohydrate and a catalyzer in the presence of nitric acid, which comprises introducing into the mixture a higher oxid of nitrogen.

In testimony that I claim the foregoing as my invention, I have signed my name in presence of two subscribing witnesses.

EMIL von PORTHEIM.

Witnesses:
 JOHANN BARBA,
 C. FISCHER.